July 18, 1967

S. F. RITTER 3,332,059

SYSTEM FOR TRANSLATING SEISMIC SIGNALS FROM
SERIAL TO PARALLEL FORMAT

Filed Aug. 14, 1964

July 18, 1967 S. F. RITTER 3,332,059
SYSTEM FOR TRANSLATING SEISMIC SIGNALS FROM
SERIAL TO PARALLEL FORMAT
Filed Aug. 14, 1964 3 Sheets-Sheet 3 ately are rendered effective under control
United States Patent Office 3,332,059
Patented July 18, 1967

3,332,059
SYSTEM FOR TRANSLATING SEISMIC SIGNALS FROM SERIAL TO PARALLEL FORMAT
Sammie F. Ritter, Dallas, Tex., assignor to Mobil Oil Corporation, a corporation of New York
Filed Aug. 14, 1964, Ser. No. 389,706
8 Claims. (Cl. 340—15.5)

The present invention relates to a system for use in continuous seismic exploration and more particularly to a system for translating serially recorded seismic signals into a temporary side-by-side format for the purpose of compositing preselected groups of seismic signals.

The present invention is particularly adapted for use in marine exploration where recently it has been found desirable to record in series form on a reel of magnetic tape seismic reflections arising from pulses or seismic energy generated by a repetitive seismic source. The seismic reflections are recorded on one track of the magnetic tape; and timing lines, together with information concerning geographical data, are recorded on a second track in the manner described and claimed in U.S. Patent No. 3,219,968, issued to George B. Loper and Frank J. McDonal, coemployees of mine, for Method and System for Recording Repetitive Seismic Signals, and in my U.S. Patent No. 3,281,775 for Automated System for the Serial Format Recording and Parallel Format Transcribing of Repetitive Seismic Signals.

As mentioned in the aforementioned patents. It is desirable that the seismic signals be composited before production of a final seismic record section. Compositing of seismic signals and the resultant advantages are well known. However, the systems for compositing are directed to the treatment of seismic traces originally recorded in a side-by-side format in the field. In order to employ such equipment for series-recorded seismic traces, the traces or signals must be translated to a side-by-side representation.

In accordance with the present invention, there is provided a system for translating the serially recorded seismic traces into a side-by-side format which lends itself to a wide latitude in the number of seismic traces which mey be composited and embodies features of reliability necessary for use in remote areas where seismic exploration is now being undertaken.

Further in accordance with the present invention, there is provided a system for sequentially directing each signal of a set of serially recorded seismic signals to a selected recording head of a whole set of recording heads for temporary storage in side-by-side relation on a recording medium. The system includes means for selecting at least a subset of the whole set of recording heads to be employed for the sequential recording. A relay is provided in operative association with each of the recording heads to connect each relay sequentially to a common input circuit. Each of the relays comprises a number of contacts, one of which is normally open and in series with the recording head associated with that relay. The state of each relay is in turn changed by means responsive to the physical position of the recording medium in order to close the normally open contacts for application to the associated recording head of one of the serially recorded signals. Each relay is maintained in its changed state until the state of a subsequent relay has been changed, whereupon the previous relay is returned to its initial state by a second means responsive to the position of the recording medium. Upon a change in the state of the last relay in the subset, the first relay in the subset is conditioned for response to a control signal and a change in the state of the relay. The sequence thereafter continues.

The translating system is essentially a relay-type ring counter possessing features providing positive action and long-term reliability so essential for use in remote areas. To this end there is provided a holding circuit for each relay to maintain it in its changed state until a succeeding relay has been changed in state, for example, energized. The release of the holding circuit is under positive control of the physical position of the recording medium.

Further in accordance with the present invention, there are provided two channels for energizing the relays, which channels alternof a binary function generator. In the embodiment to be described, each of the control or energizing circuits is associated with half of the relays and, more particularly, with alternate ones of the relays. For example, the first control circuit is operatively connected with relays 1, 3, 5, etc., and the second control circuit is operatively associated with relays 2, 4, 6, etc.

For objects and other attendant advantages of the present invention, reference may now be had to the following detailed description taken in conjunction with the accompanying drawings wherein:

FIGURE 3 is a detailed schematic of the translating system of FIGURE 1; and

Figures 1, 2:
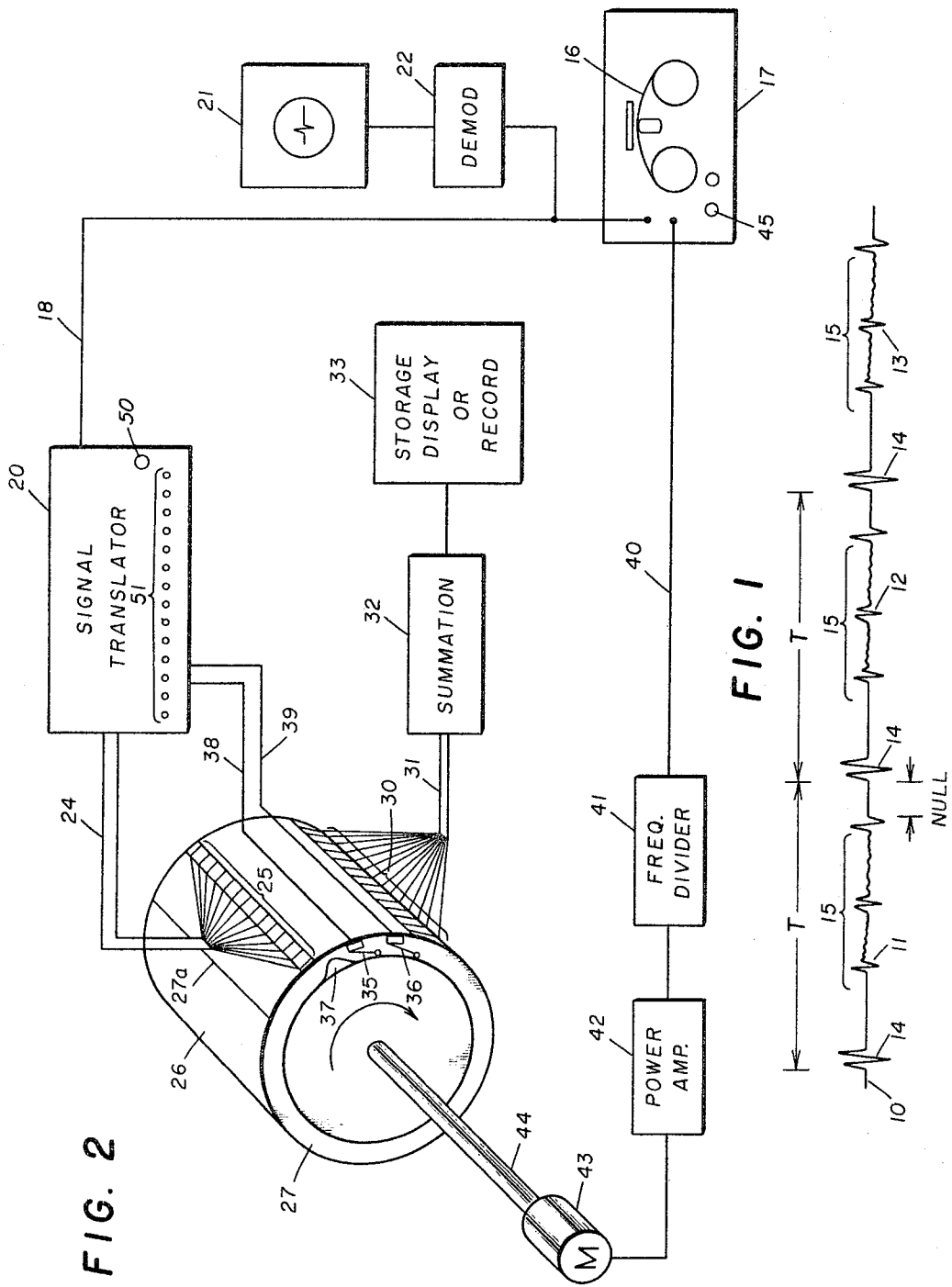
FIGURE 1 illustrates a portion of a field seismogram depicting a number of serially recorded seismic traces.
FIGURE 2 is a block schematic representation of a playback and compositing system employing the translating system of the present invention.

Referring now to the drawings, there is illustrated in FIGURE 1 a typical seismic record 10 as it would appear on one of the tracks of the dual track field tape and which, in accordance with the present invention, is to be translated for purpose of compositing. Three traces 11, 12, and 13 of seismic information have been included, and each comprises a time break 14, representing the time at which seismic energy is generated, and seismic reflections 15. The time between successive time breaks is represented by the reference character T and in practice will be approximately six seconds. The null segment shown is approximately 300 milliseconds.

Information of the type shown in FIGURE 1 may be obtained by employing a repetitive seismic source and detector system of the type described and claimed in U.S. Patent 2,994,397, issued Aug. 1, 1961, to William B. Huckabay. In order for such information to be useful in the interpretation of the subsurface formations giving rise to the reflections, it is necessary that the serially arranged seismic traces be translated in a seismic section format, such as illustrated in either FIGURES 2 or 3 of U.S. Patent 3,105,220, issued Sept. 24, 1963, to G. M. Groenendyke, and preferably that the signals be composited before production of such a section.

The translating and compositing are effected by the system of FIGURE 2. A playback system includes a tape deck 17 for reproducing from the dual track tape 16 the seismic signals of the type illustrated in FIGURE 1. The reproduced signals, which are in a frequency modulated form, are applied by way of channel 18 to an input of a signal translator 20 of the present invention. The character of the signals applied to the translator 20 may be monitored by way of an oscilloscope 21 connected to channel 18 by way of FM demodulator 22.

Under control of the translator 20, the seismic signals are applied to selected ones of a whole set of recording heads 25, shown positioned adjacent a recording medium 26 mounted on drum 27. The translating system 20 controls the number of record heads 25 to be used and effectively thereby determines the number of seismic traces to be employed in the compositing operation. For example, there are times when it will be desired to employ only a subset of the whole set of record heads and, more specifically, to employ the first four or the first eight of the recording heads. In operations where only four of the heads are to be employed, the first four seismic traces 1–4 will be recorded as traces 1–4 and then the translator will switch operations back to the first head concomitantly with the appearance of the fifth trace so that there will now appear on the recording medium traces 5, 2, 3, and 4. The operation will continue, with the next cycle being productive of a temporary recording comprised of traces 5, 6, 3, and 4.

When employing data presented in the FM mode, it is unnecessary to utilize an erase head. The seismic information in FM form may be recorded directly over previously recorded data.

The recorded information is reproduced by way of a plurality of playback heads 30 in number equal to the number of recording heads and applied by way of channel 31 to a summation or compositing unit 32. The output of the summation unit may then be utilized for storage, display, or re-recording in a seismic section format. The utilization thus described has been represented by the block 33, identified as storage, display, or record. Suitable apparatus for these purposes are well known to those skilled in the art.

The translating system 20 receives control pulses from microswitches 35 and 36 which, for simplicity, have been schematically illustrated as being mounted adjacent the periphery of drum 27. The switches 35 and 36 are operated by cam 37 to apply control pulses, respectively, by way of channels 38 and 39 to the translating system 20. The cam-controlled switch 35 is effective to generate a control pulse which will cause the translating system to select a succeeding recording head, while the cam-operated switch 36 generates a control pulse which is effective to disconnect the preceding record head. The switches 35 and 36 are displaced several degrees from one another with the switch 35 first operated to connect a succeeding recording head and the switch 36 later operated to disconnect the preceding recording head.

The rotation of drum 27 is synchronized with the playback speed of the tape deck 17 by means of the timing lines recorded on one of the channels of the dual track tape 16. The timing lines or signals, preferably of the order of 1000 cycles per second, are applied by way of channel 40 to a frequency divider 41 whose output is the order of 62.5 cycles per second. The 62.5-cycle signal is applied by way of power amplifier 42 to a synchronous motor 43 coupled by way of shaft 44 to the drum 27. The motor 43 operates at a speed controlled by the timing lines and thus by the speed of the tape deck. Once the system is in operation, the drum 27 will effectively follow any changes in playback speed of the tape deck 17.

The operation of the system is as follows. An initial portion of the field tape is played back by the tape deck 17. As well understood by those skilled in the art, a number of seismic traces are usually produced in the field as the equipment approaches the start of a traverse. This technique is employed to assure proper operation of the recording system and of the seismic source. The initial seismic information is useful later to synchronize the playback system and make necessary adjustment preparatory to the appearance of the seismic information obtained when the field equipment begins the traverse. The tape deck is energized by closing a start switch 45, whereupon the motor 43 attains a speed in driving the drum 27 related by means of the timing lines to the speed of the tape deck. By observing the presentation of the seismic data at the face of the oscilloscope 21, an operator can make adjustments in the relative position of the drum 27 such that the tape splice 27a will be in a position just past the recording heads when a time break 14 (FIGURE 1) appears at the face of the oscilloscope 21.

With the system synchronized and ready for operation, the operator may now view the splice 27a and soon after it passes the recording heads 25 he will close a start switch 50 to energize the translating system 20. The closure of the start switch will be related to a signal on the field tape representing the arrival of the field system at the start of the traverse. Thereafter, the translating means will be effective sequentially to energize the recording heads 25, all or part thereof, for recording the seismic field data in side-by-side relation on the recording medium 26.

While one method has been described for synchronizing the system and bringing it to a start condition, yet another system and one which employs a number of automatic features is described and claimed in my aforementioned patent.

As each recording head is connected in sequence, its condition is identified by energization of one of the panel lamps 51. If we assume that only four traces are to be employed for compositing, then, when the panel lamp associated with the fourth recording head has become energized, the operator will close a switch (not shown) to apply the output of the summation unit 32 to the display or record means 33.

Figure 4:
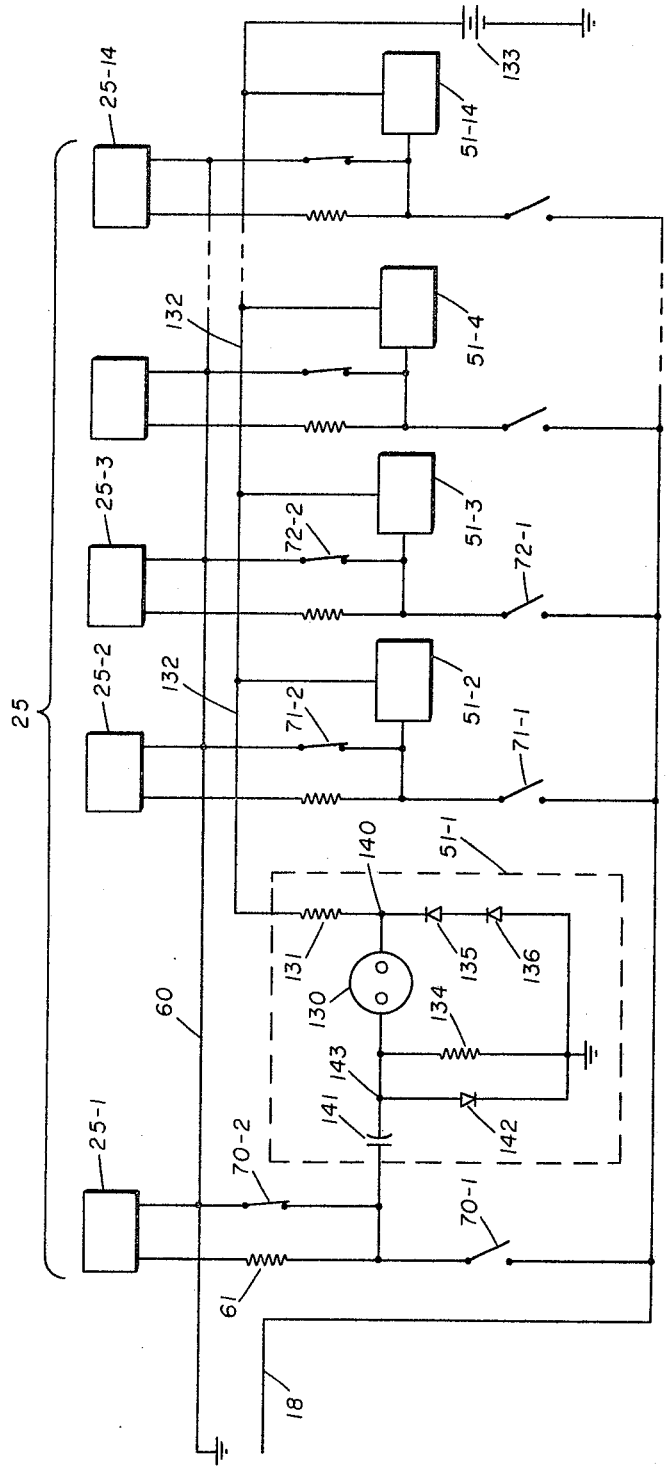
FIGURE 4 is a circuit schematic separately illustrating the recording heads of FIGURE 2, together with the elements controlled by the translating system of FIGURE 3, for sequentially connecting each of the recording heads to a common input circuit.

Referring now to FIGURE 4, there is illustrated in detail the recording heads 25 of FIGURE 2, together with associated switching circuits for enabling and disabling the recording heads. In the embodiment of the invention now in use, fourteen recording heads are employed. However, for purposes of simplification, only five of the recording heads are illustrated—the first four and the last. Since all the recording heads and associated circuits of FIGURE 4 are identical, the detailed description of one will be adequate for a complete understanding of all.

Each of the recording heads, as exemplified by the recording head 25–1, has one side connected to a ground bus or conductor 60 and the other side connected by way of current-limiting resistor 61 and normally opened switch 70–1 to the input channel 18. A normally closed switch 70–2 shorts the input to the recording head 25–1 until such time as seismic information is to be applied to that recording head. Under control of the translating system of FIGURE 3, each of the recording heads 25–1 through 25–14 is sequentially connected to the channel 18 as by the closure of the switch 70–1 and the opening of the switch 70–2 in the input circuit of recording head 25–1 and the closing and opening of similar switches in the input circuits of the other recording heads.

Figure 3:
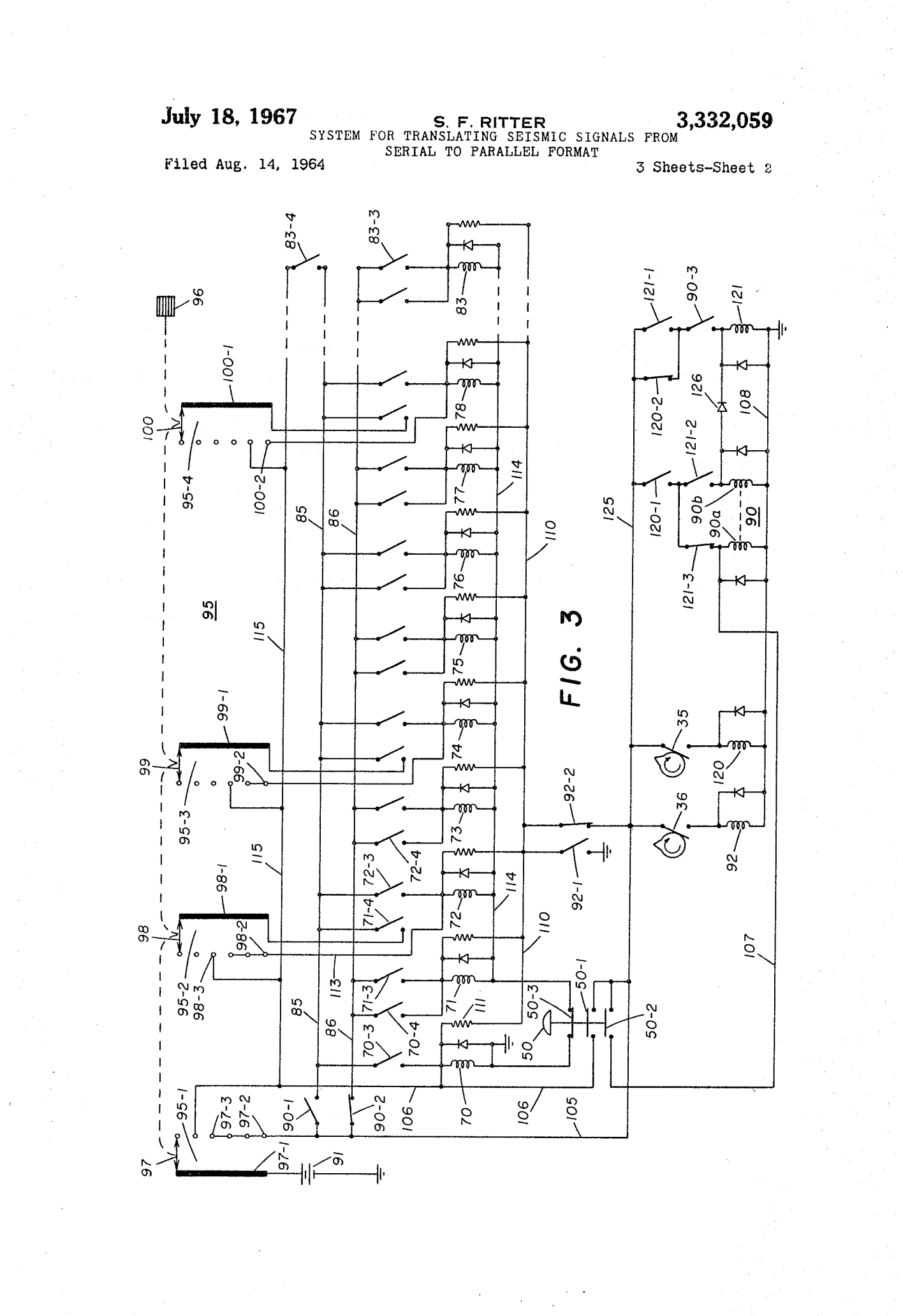

While the elements 70–1 and 70–2 have been referred to as switches, they are more properly relay contacts whose operation is under control of the relay 70 (FIGURE 3). However, for convenience in making reference to these elements, they will be referred to as switches or relay-controlled switches.

The translating system of FIGURE 3 is effective to enable and disable the recording heads of FIGURE 4 such that the first seismic trace will be applied to the recording medium by way of the recording head 25–1. After the playback drum 27 (FIGURE 2) makes one complete rotation, a control pulse will be generated by closure of the cam-operated switch 35 which, through the translating system, will be effective to disable the recording head 25–1 and to enable or connect the recording head 25–2 and so on until the last recording head of the entire group, or of a selected subgroup, has been enabled, whereupon the next complete rotation of the drum 27 will again enable the recording head 25–1. The manner in which the recording heads are connected and disconnected from the seismic input channel 18 will now be described in conjunction with the circuits illustrated in FIGURE 3.

The translating system of FIGURE 3 is comprised of a plurality of relays 70–83. Relays 79–82 are not shown for purpose of simplifying the drawing. Two energizing or hold channels 85 and 86 are provided, with the channel 86 having connections to relays 71, 73, 75, etc., and channel 85 having connections to relays 70, 72, 74, etc. The channels 85 and 86 are alternately connected, in one mode of operation, by way of relay-controlled switches 90–1 and 90–2 to a source of direct current, represented by the battery 91. The switches 90–1 and 90–2 operate in conjunction with relay-controlled switches 92–1 and 92–2 to control the operation of the ring counter, and in the following manner.

Let it be assumed, for purpose of discussion, that the selecting switch 95, comprised of four banks of switch elements 95–1, 95–2, 95–3, and 95–4, has been adjusted as by way of the knob 96 such that the movable contacts 97–100 have been moved to their lowermost positions to engage, respectively, contacts 97–2, 98–2, 99–2, and 100–2. In such position, the translating system is set for a composite of fourteen seismic traces.

With the closure of the start switch 50, relay coil 70 is energized by way of a circuit which may be traced from the battery 91, bus 97–1, contact 97–2, conductor 105, closed contact 50–1, conductor 106, the coil of the relay 70, and thence to ground. Upon energization, the relay 70 closes its switch 70–3 and the relay is now held in energized state from control channel 85 by reason of the previous closure of switch 90–1. The switch 90–1 is closed by energizing the left-hand coil 90a of latching relay 90. The coil 90a is energized by way of a circuit which may be traced from conductor 105 by way of closed contact 50–2 of the start switch 50, conductor 107, the coil 90a, and conductor 108 to ground. At the same time, relay-controlled switch 70–1 (FIGURE 4) is closed and relay-controlled switch 70–2 is opened to connect the recording head 25–1 to the input channel 18.

Seismic information corresponding to the first trace taken along the traverse is now recorded on the recording medium 26 mounted on the rotating drum 27 (FIGURE 2). When the rotating drum makes one complete revolution, cam-operated switch 35 is closed to energize coil 90b of the latch relay 90 and reverse the opened-closed relationship of the switches 90–1 and 90–2 to the positions illustrated. The coil of relay 71 is now energized from control channel 86 by way of closed contact 70–4, the coil of relay 71, closed contact 50–3 of start switch 50, and thence to ground. Even though switch 90–1 is open, relay 70, now referred to as the preceding relay, is maintained in an energized state by reason of current flowing through conductor 105, closed relay switch 92–2, conductor 110, and current-limiting resistor 111. After relay 71 has been energized, cam-controlled switch 36 is closed to energize relay 92, to open the switch 92–2, to remove the current applied to relay 70 by way of resistor 111, and to close relay switch 92–1, grounding conductor 110. The grounding of conductor 110 immediately changes the state of the relay 70 and brings it to a de-energized condition. Recording head 25–1 is now disconnected from the input channel 18 and the recording head 25–2 is connected to the input channel 18. The energizing of relay coil 71 results in the closing of its contact 71–3 to apply holding voltage by way of the voltage on channel 86. Simultaneously, contact 71–4 is closed to condition relay 72 for operation as soon as the arrangement of switches 90–1 and 90–2 is reversed to apply voltage once again to channel 85.

Upon the next revolution of the drum, cam-operated switch 35 closes, resulting in the closing of switch 90–1 and the opening of switch 90–2. With this action, voltage is now placed on channel 85. Relay 72 may now be energized by the circuit path from channel 85 through previously closed contact 71–4, across movable contact 98, bridging the bus 98–1 and fixed contact 98–2, through channel 113, the coil of relay 72, channel 114, and thence to ground by way of start switch contact 50–3. The energizing of relay 72 results in the closing of contacts 72–3 and 72–4. The closing of contact 72–3 completes a circuit from channel 85 to hold relay 72, while the closing of contact 72–4 preconditions the input circuit to relay 73 for operation upon the next revolution of the drum 27 (FIGURE 2) and the subsequent application of voltage to channel 86. With relay coil 72 energized, its contacts 72–1 and 72–2 are thrown to connect recording head 25–3 to input channel 18.

Soon after relay coil 72 is energized, relay 71 is de-energized by closing of switch 92–1 and opening of switch 92–2 under control of the cam-operated switch 36.

The operation continues with succeeding relays being energized and preceding relays de-energized with each rotation of the drum until the last relay in the set, relay 83, is energized. Upon energization of relay 83, the recording head 25–14 (FIGURE 4) is connected to the input channel 18 in the same manner as previously described with respect to the other recording heads, and relay 83 is held in an energized state by closing of the switch 83–3. At the same time, relay switch 83–4 is closed to condition the input circuit of relay 70 such that when cam-operated switch 35 is closed following energization of relay 83, switch 90–1 will be closed to apply direct current from battery 91 to the coil of relay 70 by way of channel 85, closed switch 83–4, channels 115 and 106, and thence to the upper end of the coil of relay 70. The ring counter now begins a repetition of the counting operation and the sequential connecting and disconnecting of recording heads 25–1 through 25–14, inclusive.

The type of data presentation will depend upon the dip of the formations underlying the traverse. A presentation without compositing will be desired where very sharp dips are encountered, for any attempt to composite information arising from sharply dipping beds will result in a loss rather than an enhancment of information. However, where the dip is smaller, compositing will enhance data; and the amount of compositing will depend upon a number of factors that ultimately can only be determined by examination of the seismic sections produced by compositing different numbers of seismic traces. To this end, an operator will produce a first seismic section without compositing, or perhaps compositing only two traces; then another section resulting from the compositing of four traces; and yet another section perhaps of eight or fourteen traces. A comparison of the sections will reveal the optimum compositing or mix to be employed in writing seismic sections for that particular geographical area.

Therefore, in accordance with the present invention, a selector switch 95 is provided to modify the ring counter and effectively to make available therefrom a number of ring counters for presentation of seismic data in different formats.

The selector switch 95 may be a six-position rotary switch. In the first and illustrated position, the movable contacts 97–100 are in the OFF position. In the second position, every seismic trace is applied to the first recording head for production of a noncomposed seismic section. In the third position, two traces are composited; in the fourth position, four traces are composited; in the fifth position, eight traces are composited; and in the sixth position, as previously described, fourteen traces are recorded for purposes of compositing.

With the movable contacts 97–100 moved to the second position, only the relay 70 will be energized to make possible the production of a noncomposited seismic section. The remaining relays in the counter are disabled and rendered nonresponsive to actions of the cam-operated switches 35 and 36. Direct current is applied from battery 91 by way of the bus 97–1, movable contact 97, and thence by way of channel 106 to the operating coil of relay 70. The opposite end of the relay is connected to ground. Hence, the relay 70 continues in an energized state until such time as the movable contact 97 is moved to another position. Under this condition, the field data comprised of the serially recorded seismic traces are recorded one after another on track 1 or trace 1 of the recording medium.

When a two-trace composite is desired, the movable contacts 97–100 will be moved to the third position of selector switch 95 wherein the movable contact 97 will bridge the bus 97–1 and fixed contact 97–3, while the movable contact 98 will bridge the bus 98–1 and fixed contact 98–3. With such an arrangement, only the relays 70 and 71 will comprise the ring counter, with the remaining relays 72–83 effectively disabled. This is by reason of the fact that in order for the relay 72 to be energized and thus carry on the counting operations, it is required that direct current be applied to the conductor 113. As illustrated, this condition cannot occur until the movable contact 98 moves to the fourth position, or lower.

If it be assumed that relay 70 previously has been energized and now the relay 71 is energized, it can be seen that the closure of relay contact 71–4 has effectively connected control channel 85 to channel 115 by way of bus 98–1, movable contact 98, and fixed contact 98–3. Therefore, upon the next closure of switch 90–1, the coil of relay 70 effectively will be connected to the battery 91, and the relay will be energized, once more to connect the recording head 25–1 to the input channel 18 (FIGURE 4).

The selection of other subsets of recording heads and effectively other ring counters comprised of different numbers of relays 70–83 is effected as aforesaid by movement of the selector switch 95. The operation of these other combinations providing the different selected subsets is now evident from the description of the two-element counter.

The latch relay 90 is controlled by way of a binary circuit such that upon a first closure of the switch 35, one coil of the latch relay is energized; and upon the next closure of the switch 35, the other coil of the latch relay is energized. The alternate operation of the latch relay 90 is carried out under the control of relays 120 and 121. It will be recalled that with the closure of start switch 50, the latch relay was energized by way of its coil 90a. The energization of coil 90a or the operation of the latch relay in one direction causes relay switch 90–3 to close and to energize relay 121. Relay-controlled switch 121–1 is now closed to hold relay 121 energized, and relay-controlled switch 121–2 is closed and relay-controlled switch 121–3 opened so that upon the next closure of relay-controlled switch 121–1, coil 90b of the latch relay will become energized.

Upon the first closure of cam-operated switch 35 following the operation of the start switch 50, relay 120 is energized to close switch 120–1 and energize coil 90b of the latch relay 90 by way of conductors 105, 125, and previously closed relay-controlled switch 121–2. The relay 121 remains energized despite the opening of switch 90–3 by reason of flow of current through diode 126, which flow of current will continue until cam-operated switch 35 is opened. Upon opening of the cam-operated switch 35, the relays 120 and 121 are de-energized so that the various switches controlled by these relays assume the positions illustrated.

The relay 121 is in effect a steering relay which will determine which coil of the latch relay is to be energized. It operates following the closure of switch 35 and during alternate periods of de-energization of the relay 120. An examination of the circuit of FIGURE 3 with the various switch elements in the positions illustrated reveals relay 121 in a de-energized state. When cam-operated switch 35 closes, relay 120 will be energized to close its switch 120–1 and apply direct current to energize the coil 90a of the latch 90. Switch 120–2 opens during the time that the relay 120 is energized. Upon opening of cam-operated switch 35 and the de-energization of relay 120, the switch 120–2 is closed and relay 121 is actuated through a circuit which includes the switch 120–2 and the previously closed switch 90–3. Relay-controlled switches 121–2 and 121–3 are closed and opened, respectively, so that upon the next closure of cam-operated switch 35 and the resutlant energization of relay 120, coil 90b of latch relay 90 will be energized. During the time the switch 35 is closed, relay-controlled switch 120–2 is open. And now with the resultant opening of switch 90–3, relay 121 will be de-energized upon the de-energization of relay 120. Accordingly, the relay 121 is energized for every other closure of the cam operated switch 35 in order to direct control pulses alternately to the coils 90a and 90b of the latch relay 90.

The diode 126, as aforesaid, provides a function of holding the relay 121 in an energized condition during the time coil 90b is being energized. In addition, the diode 126 prevents current from flowing to the coil 90b when coil 90a is being energized and relay 121 is being energized through closed switches 90–3 and 121–1.

All the relays of FIGURE 3 are shunted by diodes to reduce the inductive surge produced whenever any one of the relays is de-energized and thus to reduce sparking otherwise resulting at any of the contacts connected to the relay coils.

The recording heads 25 have associated therewith indicating lamps 51 which are individually illuminated whenever the recording head associated therewith is connected to the input channel 18. More particularly, and referring once again to FIGURE 4, there are illustrated a plurality of indicators 51. For purpose of simplicity, only the indicators 51–1 through 51–4 and 51–14 have been illustrated. The indicators provide two functions: (1) identify the recording head connected to the input channel and (2) indicate whether the signal applied to the input channel 18 is of amplitude adequate for recording purposes.

When any one of the recording heads is connected to the input channel 18, and as the signal amplitude is of predetermined value, the indicator associated with that recording head will be energized and in the following manner. Since each of the indicators is identical, the description of one will be adequate for an understanding of the operation of all of them. The indicator 51–1 includes a neon lamp 130 connected by way of dropping resistor 131 and conductor 132 to one side of a source of direct current represented by battery 133. The other side of the lamp is connected by way of resistor 134 and ground to the other side of the battery 133. A pair of serially connected Zener diodes 135 and 136 are connected in parallel across the lamp 130 and the resistor 134 to regulate the potential applied to one side of the lamp. It is a well-known feature of a neon lamp that it will become illuminated only upon the existence across the lamp of a minimum voltage of predetermined amplitude. In one embodiment now in use, the Zener diodes 135 and 136 hold the voltage at point 140 at approximately 40 volts. The lamp requires a potential difference of at least 60 volts to become illuminated. When the recording head 25–1 is connected to the input channel 18, the negative-going portion of the input signal is effective to charge capacitor 141, the positive portions being shunted to ground by way of diode 142. If the negative-going portion is at least 20 volts, indicating an FM seismic signal for recording purposes of at least 40 volts peak-to-peak, then the voltage at point 143 will be at least −20 volts with respect to ground, and the lamp 130 will be illuminated. Should the lamp become extinguished during recording operations, it will be evident to the operator that the signal level has dropped below the desired minimum value and steps can be taken to correct the cause of the drop in signal level.

Now that one embodiment of the invention has been described, modifications will become apparent to those skilled in the art and it is intended to cover all such modifications as fall within the scope of the appended claims.

What is claimed is:
1. A seismic data processing system comprising:
(a) means for reproducing serially recorded seismic signals,

(b) a rotatable drum adapted to support a recording medium, (c) $n$ number of recording heads adjacent said drum and arranged transversely of direction of movement thereof, (d) means for applying to individual ones of said recording heads said reproduced seismic signals, (e) $n$ number of playback heads adjacent said drum and spaced from said recording heads, (f) $n$ number of record relays each associated with one of said recording heads for controlling said signal applying means, (g) a relay control circuit means controlling the application of energizing current to said record relays to apply a separate seismic signal to one of said recording heads upon each revolution of said drum, said control circuit means being responsive to a first rotational position of said drum for removing energizing current from an $n-k$ record relay and for concurrently applying energizing current to an $n-k+1$ record relay of said record relays where $k$ is an integer having successive whole values of $(n-1)$ to 0, and (h) a relay holding circuit means, said holding circuit means being effective to hold said $n-k$ record in an operative state still said $n-k+1$ record relay record has been energized by said relay control circuit means and responsive to a second rotational position of said drum for releasing said $n-k$ record relay after said $n-k+1$ record relay has been energized.

2. A seismic data processing system comprising:
(a) means for reproducing serially recorded seismic signals, (b) a rotatable drum adapted to support a recording medium, (c) $n$ number of recording heads adjacent said drum and arranged transversely of direction of movement thereof, (d) means for applying to individual ones of said recording heads said reproduced seismic signals, (e) $n$ number of playback heads adjacent said drum and spaced from said recording heads, (f) $n$ number of record relays each associated with one of said recording heads for controlling said signal applying means, (g) a relay control circuit means controlling the application of energizing current to said record relays to apply a separate seismic signal to one of said recording heads upon each revolution of said drum, said control circuit means being responsive to a first rotational position of said drum for removing energizing current from an $n-k$ record relay and for concurrently applying energizing current to an $n-k+1$ record relay of said record relays where $k$ is an integer having successive whole values of $(n-1)$ to 0, (h) a relay holding circuit means, said holding circuit means being effective to hold said $n-k$ record relay in an operative state until said $n-k+1$ record relay has been energized by said relay control circuit means and responsive to a second rotational position of said drum for releasing said $n-k$ record relay after said $n-k+1$ record relay has been energized, and (i) means for rendering less than all $n$ record relays responsive to said relay control circuit means for reducing the total number of seismic signals appearing at any one time on said recording medium.

3. The system of claim 1 wherein said relay control circuit means comprises:
(a) a first control channel and a second control channel,
(b) switch means for connecting alternate ones of said record relays to said first control channel and to said second control channel, (c) a control pulse generating means responsive to the position of said drum, (d) a means responsive to said control pulses for alternately energizing said first and said second control channels, and (e) a normally open contact of each of said record relays in series between the succeeding record relay and the control channel associated therewith.

4. The system of claim 1 wherein the holding circuit means comprises:
(a) $n$ parallel branches each including a voltage dropping resistor, each of said parallel branches separately connected at one end to individual ones of said record relays, said voltage dropping resistors being of high value to apply to said relays voltage sufficient only to hold a previously energized record relay in an operative state, the opposite ends of said parallel circuits being connected to a common point, and (b) a switch means responsive to said second rotational position of said recording drum for disconnecting said common point and removing holding voltage from all of said record relays.

5. The system of claim 4 wherein said switch means concurrently connects said common point to ground potential.

6. A device for sequentially directing each signal of a set of serially recorded seismic signals to a particular recording head of a whole set of recording heads for temporary storage on a recording medium in side-by-side relation, said device comprising:
(a) means for selecting at least a subset of the whole set of recording heads to be used for sequential recording, (b) a record relay operatively associated with each of said recording heads, (c) each of said record relays having normally open contacts in series with its associated recording head, (d) means responsive to the position of said recording medium for energizing in turn each of said record relays to close said contacts for application to the associated recording head of one of the serially recorded signals, (e) means for holding a previously energized record relay in an operative state until a subsequent record relay is energized, (f) means responsive to the position of said recording medium for de-energizing said holding means to release the previously energized record relay and open the contacts associated therewith prior to the application of the next serially recorded seismic signal to the succeeding recording head, and (g) means responsive to the energization of the last record relay for conditioning the first relay for response to said energizing means.

7. In a seismic data processing system including a rotatable recording drum and a plurality of recording heads positioned transversely of rotation of said drum, a translating means for reproducing serially recorded seismic signals for temporary storage on said recording drum in a side-by-side format, said translating means comprising:
(a) a relay ring counter including a plurality of record relays each associated with one of said recording heads for sequentially applying seismic signals to each of the recording heads, (b) relay control circuit means controlling the application of energizing current to said record relays to apply a separate seismic signal to one of said recording heads upon each revolution of said drum, said control circuit means being responsive to a first position of said recording drum for removing energizing current from a preceding one of said record relays and for concurrently applying energizing current to a succeeding one of said record relays, and (c) relay holding circuit means for holding said preceding record relay in an operative state and responsive to a second position of said recording drum for releasing said preceding record relay after said succeeding record relay has been energized.

8. The system of claim 7 wherein said relay control circuit means comprises:
  (a) a first channel and a second channel, said first channel being associated with alternate ones of the relays comprising said ring counter and said second channel being associated with remaining ones of said relays,
  (b) a source of relay energizing voltage,
  (c) latch relay means including two coils for alternately connecting said channels to said source,
  (d) a switch relay responsive to said first position of said drum for generating control pulses, and
  (e) a conditioning relay responsive to alternate ones of said control pulses for alternately directing said control pulses first to one coil and then to the other coil of said latch relay.

References Cited

UNITED STATES PATENTS

| | | | |
|---|---|---|---|
| 2,767,389 | 10/1956 | McCollum | 340—15.5 |
| 3,065,454 | 11/1962 | Moore | 340—15.5 |
| 3,210,770 | 10/1965 | Woods et al. | |
| 3,262,095 | 7/1966 | Wells et al. | 340—15.5 |
| 3,277,439 | 10/1966 | Riggs et al. | 340—15.5 |

SAMUEL FEINBERG, *Primary Examiner.*

R. M. SKOLNIK, *Assistant Examiner.*

UNITED STATES PATENT OFFICE
CERTIFICATE OF CORRECTION

Patent No. 3,332,059                      July 18, 1967

Sammie F. Ritter

It is hereby certified that error appears in the above numbered patent requiring correction and that the said Letters Patent should read as corrected below.

Column 1, line 17, for "or" read -- of --; line 29, for "patents. It" read -- patents, it --; line 43, for "mey" read -- may --; column 2, line 52, for "in" read -- into --; column 5, line 42, after "closed" insert -- relay --; column 6, line 32, for "enhancment" read -- enhancement --; line 54, for "noncomposed" read -- noncomposited --; column 9, line 24, strike out "cir-"; line 26, for "still" read -- until --; same line 26, before "in" insert -- relay --; line 27, strike out "record".

Signed and sealed this 18th day of June 1968.

(SEAL)
Attest:

Edward M. Fletcher, Jr.
Attesting Officer

EDWARD J. BRENNER
Commissioner of Patents